US007174137B2

(12) United States Patent
Fitzgibbon et al.

(10) Patent No.: US 7,174,137 B2
(45) Date of Patent: Feb. 6, 2007

(54) WIRELESS TRANSMIT-ONLY APPARATUS AND METHOD

(75) Inventors: James J. Fitzgibbon, Batavia, IL (US); Robert Roy Keller, Jr., Chicago, IL (US); Bernard J. Wojiak, Naperville, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 435 days.

(21) Appl. No.: 10/645,325

(22) Filed: Aug. 21, 2003

(65) Prior Publication Data

US 2005/0042992 A1 Feb. 24, 2005

(51) Int. Cl.
*H04B 1/034* (2006.01)
*G08C 19/00* (2006.01)

(52) U.S. Cl. ........................ 455/95; 455/103; 455/354; 340/825.72; 340/825.73

(58) Field of Classification Search ................. 455/91, 455/93, 95, 103, 118, 150.1, 151.1, 151.2, 455/153.1, 352–355; 340/825.71, 825.72, 340/825.73
See application file for complete search history.

(56) References Cited

U.S. PATENT DOCUMENTS 3,576,482 A * 4/1971 Rhee ........................... 318/16
3,869,671 A * 3/1975 Schroder .................... 375/295
4,021,756 A * 5/1977 Podowski et al. ...... 331/117 R
4,794,622 A * 12/1988 Isaacman et al. ........... 375/312
5,564,101 A 10/1996 Eisfeld
6,005,508 A 12/1999 Tsui
6,356,082 B1 * 3/2002 Alkire et al. ............... 324/326
6,486,795 B1 11/2002 Sobel et al.
2003/0073417 A1 4/2003 Nantz et al.
2005/0042991 A1 * 2/2005 Fitzgibbon et al. ........... 455/95

FOREIGN PATENT DOCUMENTS

DE 10226294 A1 12/2003
JP 40406494 A * 2/1992

* cited by examiner

*Primary Examiner*—Nguyen T. Vo
(74) *Attorney, Agent, or Firm*—Fitch, Even, Tabin & Flannery

(57) ABSTRACT

A wireless transmit-only apparatus (20) can be comprised of a controller (21) that selectively controls which of a plurality of resonant devices (24 and 25) are utilized to influence the transmission carrier frequency of a transmitter (26). In a preferred embodiment at least one of the resonant devices comprises a mechanically resonant device (24) such as a surface acoustic wave device, a crystal resonator, or a ceramic resonator. In a preferred embodiment, a user interface (22) includes a plurality of independently assertable inputs. The controller responds to assertion of one of this inputs by selecting a particular set of characterizing transmission parameters (as are stored, for example, in a memory (23) and using those characterizing transmission parameters to transmit a message using a transmission carrier frequency as corresponds to use of a co-selected resonant device.

25 Claims, 3 Drawing Sheets

WIRELESS TRANSMIT-ONLY APPARATUS AND METHOD

TECHNICAL FIELD

This invention relates generally to wireless transmit-only devices and more particularly to frequency agile transmitters.

BACKGROUND

Wireless transmitters of various kinds are known in the art. Some transmitters comprise a transceiver that can both transmit and receive information in order to facilitate, for example, programming. Other devices only support transmission. For example, remote control devices as used with movable barrier operators are often transmit-only devices.

In general, prior art transmit-only devices of this sort utilize a single transmission frequency. In fact, some manufacturers differentiate their products from their competitors by utilizing remote control signaling transmitters that operate on a frequency that is intentionally different from their competitors.

In more recent time, however, steps have been taken to permit greater compatibility as between the devices that are provided by different manufacturers. For example, there are movable barrier operators that can compatibly receive the transmissions of devices from various manufacturers. In particular, such operators have frequency-agile receivers that can receive the transmissions from a plurality of transmitters that use differing transmission frequencies.

In a similar manner, so-called universal transmitters have been proposed that can transmit remote control signals as correspond to the transmission frequencies (and protocols) of a plurality of differing systems. Such transmitters can therefore operate compatibly with a variety of movable barrier operators and therefore potentially provide greater convenience to a user. For example, a person owning a home having a garage that utilizes a first movable barrier operator system and a weekend cottage having a garage that utilizes a second movable barrier operator system can utilize a single remote control transmitter to operate both systems notwithstanding that the two systems might otherwise be incompatible with one another.

Such universal transmitters have not met with significant commercial success in all respects, however. There may be any number of causes associated with this circumstance, but cost appears to be at least one significant contributor. In particular, the frequency agility requirements of such a transmitter represents a considerable incremental cost increase. Such incremental cost in turn may represent an impediment to more widespread utilization and acceptance.

BRIEF DESCRIPTION OF THE DRAWINGS

The above needs are at least partially met through provision of the wireless transmit-only apparatus and method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a transmit-only apparatus having frequency agility can be economically realized through use of a plurality of discrete resonant devices, and particularly wherein at least one of the discrete resonant devices comprises a mechanically resonant device (such as, but not limited to, a surface acoustic wave device, a crystal resonator, or a ceramic resonator). In a preferred embodiment, all of the discrete resonant devices comprise a mechanically resonant device and in a most preferred embodiment, surface acoustic wave devices.

Pursuant to one preferred approach, a plurality of discrete user assertable inputs are monitored. When one is asserted (by, for example, an operator), a particular resonant device (of a plurality of discrete resonant devices) as corresponds to the asserted user input is identified and a message comprising bearer content that corresponds to the asserted input is then transmitted using that identified resonant device. Such resonant devices can be utilized with an oscillator circuit that operates in conjunction with a transmitter. Pursuant to one approach, a plurality of selectable oscillator circuits can be provided wherein each such oscillator circuit has a corresponding resonant device. Pursuant to another approach, a single oscillator circuit operates with a plurality of selectable resonant devices.

So configured, a transmitter can be imbued with frequency agility at a considerably reduced cost as compared to prior art efforts in this regard. This economy results in part through the relatively low cost of virtually all the incremental components required to support such frequency agility. Such an approach also lends itself well to relatively high levels of integration as well, thereby further contributing to minimized cost.

Figure 1:
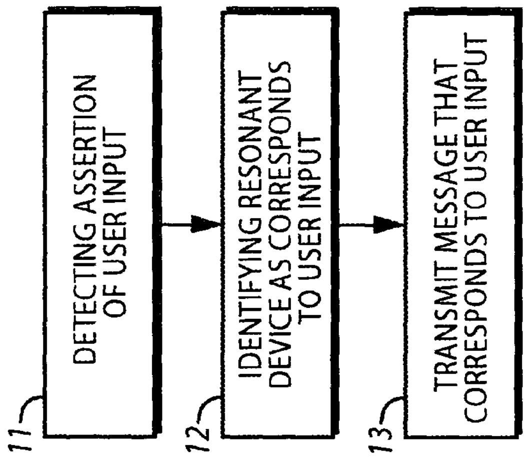
FIG. 1 comprises a flow diagram as configured in accordance with an embodiment of the invention.

Referring now to the drawings, and in particular to FIG. 1, a process 10 detects 11 assertion of user input, identifies 12 a resonant device as corresponds to that user input, and transmits 13 a message that corresponds to that user input.

Pursuant to a preferred approach, when detecting 11 assertion of a user input, the process 10 detects assertion of a particular one of a plurality of discrete user assertable inputs. For example, the plurality of discrete user assertable inputs can comprise a plurality of push buttons and the process 10 detects 11 when a particular one of that plurality of push buttons has been asserted.

Also pursuant to a preferred approach, when identifying 12 the resonant device that corresponds to the particular user input that has been asserted, the process identifies 12 a particular resonant device of a plurality of discrete resonant devices. For example, when there are three discrete user assertable inputs there are also three corresponding discrete resonant devices; with one of the discrete resonant devices corresponding specifically to one of the discrete assertable inputs, respectively. The plurality of discrete resonant devices include at least one mechanically resonant device (including but not limited to a surface acoustic wave device, a crystal resonator, or a ceramic resonator).

In a preferred approach, all of the plurality of discrete resonant devices comprise a mechanically resonant device. Various mechanically resonant devices can be included (for example, when there are three discrete resonant devices in total, two of these devices can be a surface acoustic wave device and one can be a ceramic resonator) or all of the mechanically resonant devices can belong to a common family of devices (for example, all of the mechanically resonant devices can comprise a surface acoustic wave device).

These plurality of discrete resonant devices will preferably differ from one another with respect to their individual resonant frequency. In a preferred embodiment, when transmitting 13 the message that corresponds to the asserted user input, the transmission will be effected via a carrier frequency that corresponds to the identified resonant device.

As will be shown below, in a preferred approach, the bearer content of the transmitted message (that is, the substantive informational or instructional content or meaning of the transmitted message) can be identical or at least substantially the same as between at least some of the discrete user inputs (for example, each of the user inputs can represent a "move the barrier" remote control command for each of a corresponding plurality of different makes of movable barrier operator). At the same time, however, other attributes of the transmission can be expected to vary one from the other. In particular, the various transmission parameters that characterize a given communication protocol (such as, but not limited to, a specific data frame structure, an operational code, a rolling code value, an algorithm to facilitate calculation of a next code to be transmitted, and so forth) can and will differ in this regard. Pursuant to a preferred approach, therefore, the appropriate transmission parameters as correspond to a given discrete user input are also selected and used when transmitting 13 the message as well as the identified resonant device.

Figure 2:
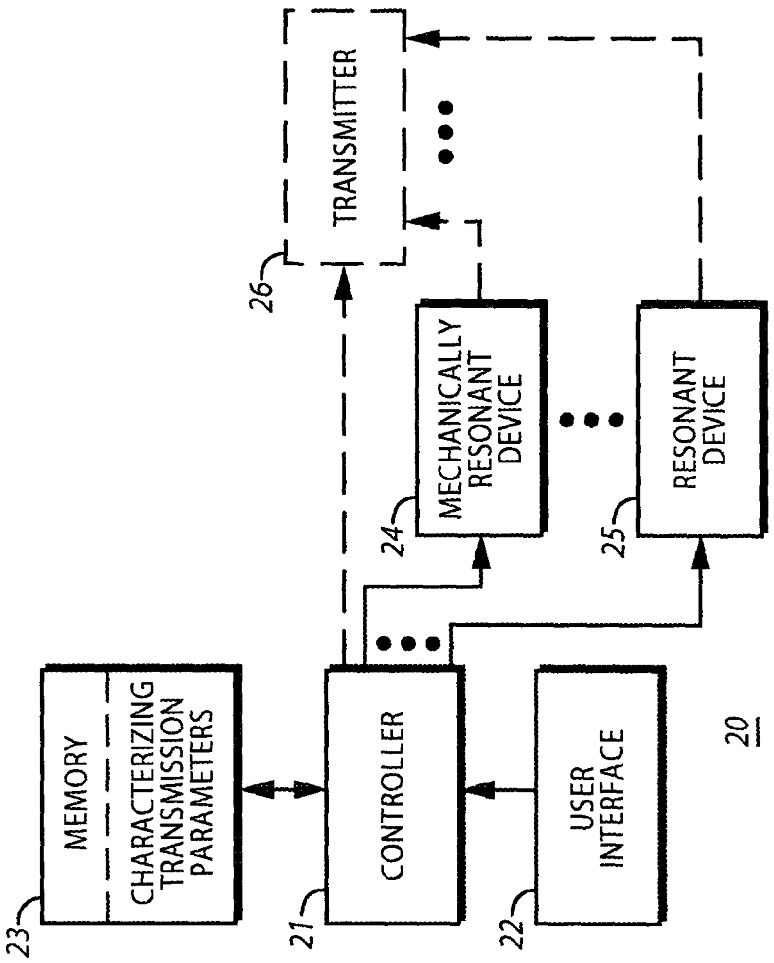
FIG. 2 comprises a block diagram as configured in accordance with various embodiments of the invention.

Such a process can be implemented in a variety of ways. Pursuant to one approach, and referring now to FIG. 2, a transmit-only apparatus 20 can be generally comprised of a controller 21, a user interface 22, a memory 23, and a plurality of resonant devices 24 and 25.

The controller 21 can be comprised of a wide variety of suitable platforms including both programmable (and partially programmable) platforms and dedicated-function platforms. Such architectural possibilities are well understood in the art and hence further elaboration will not be provided here for the sake of clarity and brevity. As will become more clear below, this controller 21 has access to correlation data that correlates independently assertable inputs with a corresponding transmission message and also to a particular one of the resonant devices 24 and 25. In particular, this controller 21 responds to assertion of a given one of a number of independently assertable inputs by selecting corresponding characterizing transmission parameters to thereby cause a transmitter 26 to utilize a particular resonant device 24 or 25 as corresponds to the selected corresponding characterizing transmission parameters when transmitting the transmission message that corresponds to the selected corresponding characterizing transmission parameters.

Figure 3:
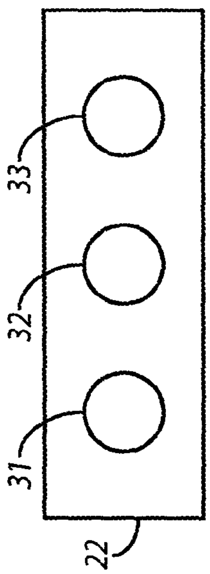
FIG. 3 comprises a detailed view as configured in accordance with an embodiment of the invention.

The user interface 22 comprises at least one independently assertable input. In a preferred embodiment the user interface 22 comprises a plurality of independently assertable inputs. To illustrate, and referring momentarily to FIG. 3, the user interface 22 can be comprised of three independently assertable inputs 31, 32, and 33 such as, for example, three discrete push buttons. It will be understood that such an embodiment serves as an illustration only, and that numerous other configurations are possible, including a fewer and larger number of independently assertable inputs and/or other assertable input form factors. It would also be possible to provide a variety of different assertable input form factors in a single embodiment to suit, for example, the needs of a given application.

The memory 23 can be comprised of a single memory or a plurality of memory devices in a manner well understood in the art. This memory 23 contains a plurality of characterizing transmission parameters that correspond to particular ones of the plurality of resonant devices 24 and 25. More particularly, these characterizing transmission parameters further correspond to a plurality of transmission messages. In a preferred embodiment, these transmission messages each have substantially common bearer content as compared to others of the plurality of transmission messages. For example a number of these transmission messages can all have bearer content that comprises instructional content to a movable barrier operator to initiate movement of a corresponding movable barrier.

Notwithstanding that the bearer content will be substantially identical amongst such a group of transmission messages, these transmission messages will also each have at least one substantially differing characterizing transmission parameter as compared to others of the plurality of transmission messages. For example, such transmission parameters can include specifics that pertain to a given signaling, transmission, and/or control protocol as per the dictates of a corresponding given operating system paradigm. To illustrate, the data frame structure can vary from transmission message to transmission message to reflect such differing requirements. Accordingly, the memory 23 can include a corresponding characterizing transmission parameter in this regard; i.e., information regarding the data frame structure to be utilized when transmitting a given transmission message. Other examples of possibly relevant characterizing transmission parameters include, but are not limited to, a particular operational code, and a rolling code value and/or an algorithm to facilitate calculation of a next code to transmit (for use with a movable barrier operator that makes use of so-called rolling codes as is otherwise well understood in the art), to name a few.

The resonant devices 24 and 25 can comprise any number of resonant devices provided that the plurality includes at least one mechanically resonant device 24. Preferably, there will be at least one resonant device for each potential operating frequency. Any of a variety of mechanically resonant devices can be utilized, including but not limited to surface acoustic wave devices, crystal resonators, and ceramic resonators. In a preferred embodiment, all of the resonant devices comprise such mechanically resonant devices. Such resonator devices are themselves well understood in the art and hence further description here will not be provided for the sake of brevity and the preservation of focus. In one embodiment all of the resonant devices comprise surface acoustic wave devices.

These resonant devices 24 and 25 are switchably selectable by the controller 21. When selected by the controller 21, the selected resonant device serves to influence the carrier frequency used by a corresponding transmitter 26. Accordingly, the plurality of resonant devices preferably includes devices that resonant at differing frequencies from one another and further that resonate at frequencies of interest and that accord with desired transmission frequencies as relevant to a given set of application requirements.

Figure 4:
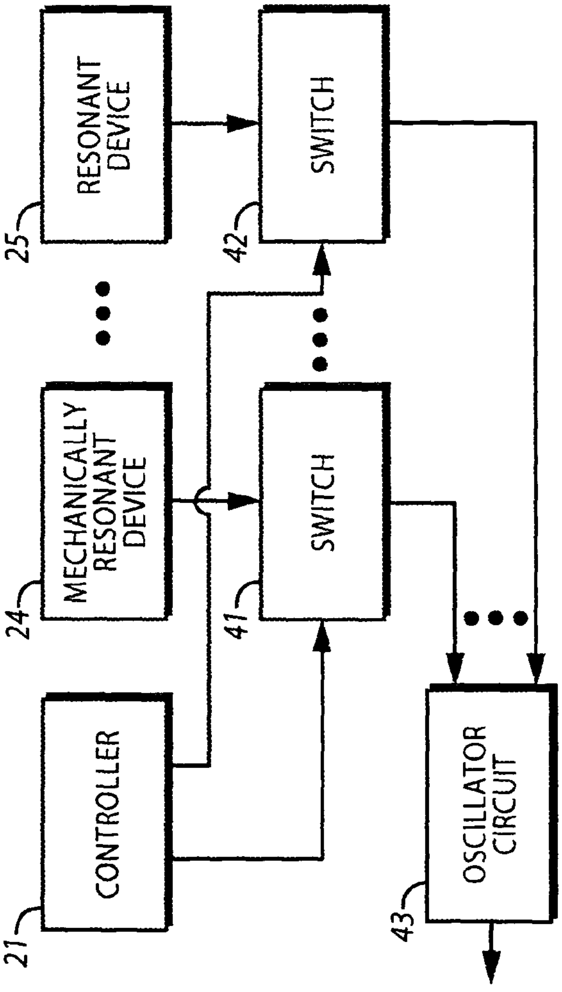
FIG. 4 comprises a detailed block diagram as configured in accordance with an embodiment of the invention.

The above selection needs can be met in a variety of ways. For example, and referring now to FIG. 4, a single oscillator circuit 43 can be provided that operates in conjunction with any resonant device 24 and 25 as selected by the controller 21. In such an embodiment a switch 41 and 42 as are controllably coupled to the controller 21 can be used to selectively control which of the resonant devices 24 and 25 is coupled, at any given moment, to the oscillator circuit 43 (such switches can be any of a wide variety of switches as are presently known or hereafter developed; present examples include but are not limited to a transistor, a pin diode circuit, and a relay, to name a few). This, in turn, of course controls the resonant frequency at which the oscillator circuit 43 oscillates. When this oscillator circuit 43 comprises a part of a transmitter, or is otherwise used in conjunction with a transmitter, the oscillating output of the oscillator circuit is then used to control the carrier frequency used by the transmitter to convey a corresponding message. As illustrated, at least one of the resonant devices comprises a mechanically resonant device 24. In a preferred embodiment, as noted earlier, all of the resonant devices comprise a mechanically resonant device such as a surface acoustic wave device.

Figure 5:
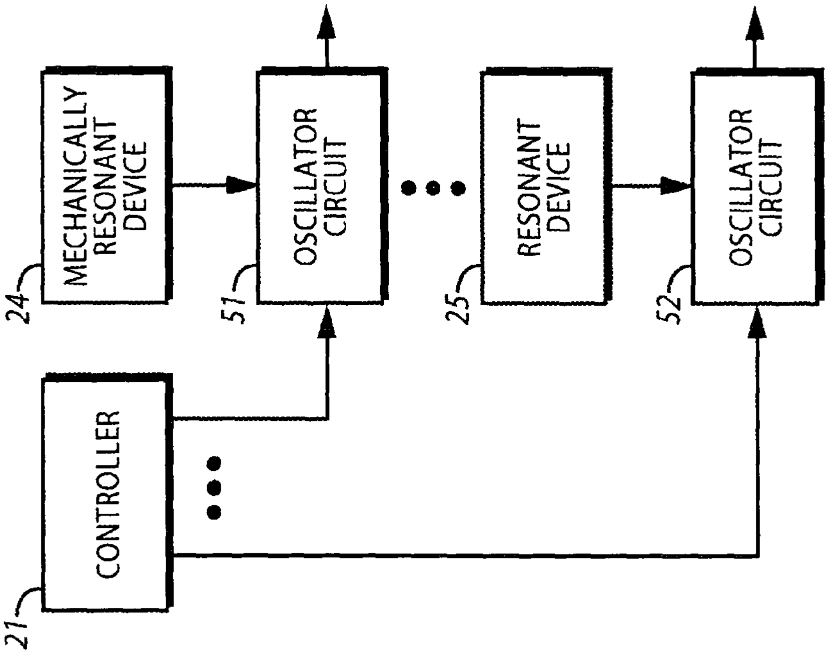
FIG. 5 comprises a detailed block diagram as configured in accordance with another embodiment of the invention.

As another example, and referring now to FIG. 5, a plurality of oscillator circuits 51 and 52 can be provided. In a preferred approach, each of the oscillator circuits 51 and 52 has a corresponding resonant device 24 and 25, respectively. As illustrated, each of the oscillator circuits 51 and 52 is operably coupled to the controller 21. So configured, the controller 21 can control which of the oscillator circuits 51 and 52 is presently active and/or is otherwise coupled to aid in defining the transmission frequency of the transmitter. By providing each such oscillator circuit 51 and 52 with a resonant device 24 and 25 having a different resonant frequency, each such oscillator circuit 51 and 52 can be assured of providing a different oscillating signal output. As before, in a preferred approach, all of the resonant devices will comprise a mechanically resonant device such as, for example, a surface acoustic wave device.

These teachings can be readily used to embody a variety of useful devices including, for example, a transmit-only remote control apparatus suitable for use with a movable barrier operator. In particular, such an apparatus can have the benefit of frequency agility to match the protocol needs of a plurality of different signaling systems while concurrently remaining a cost effective platform.

Figure 6:
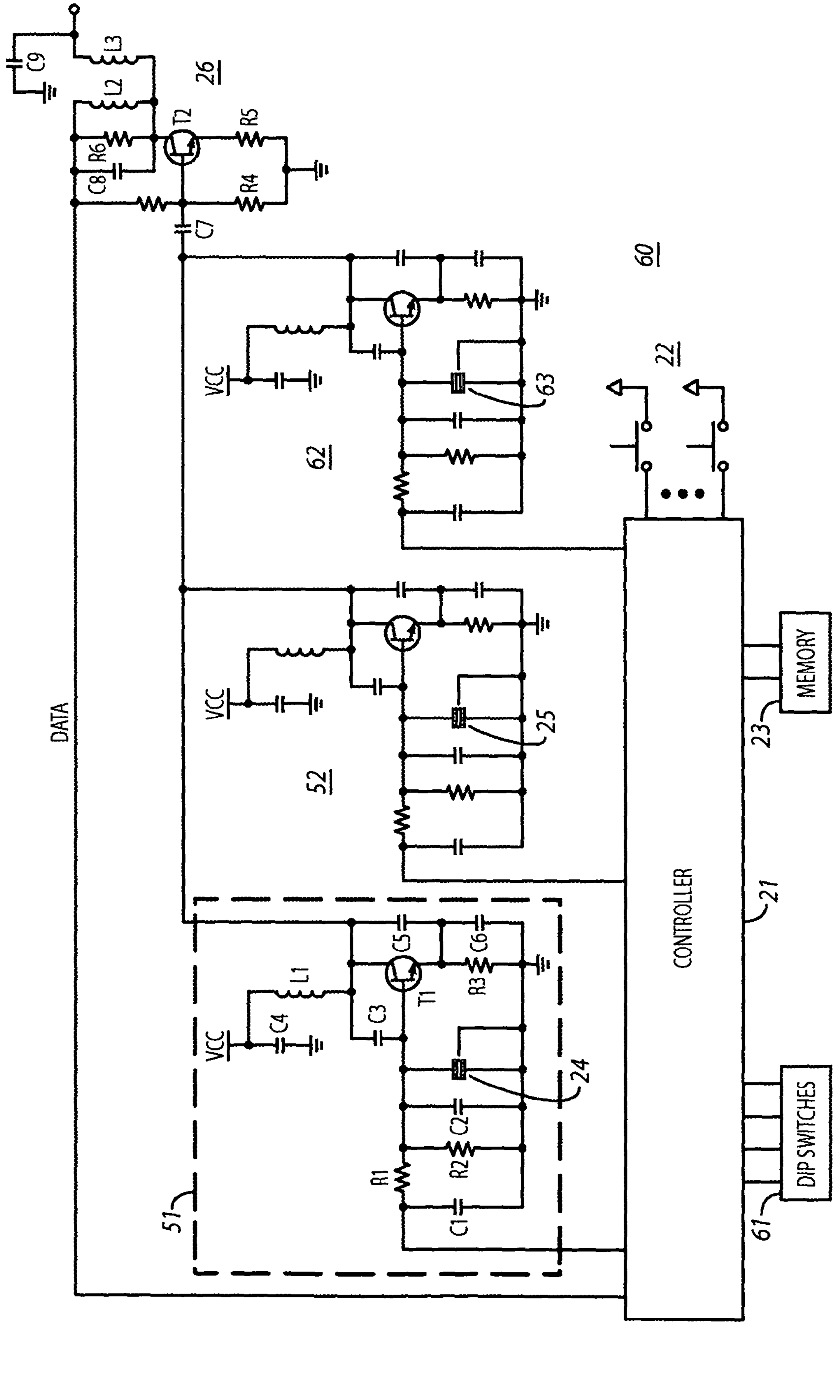
FIG. 6 comprises a schematic diagram as configured in accordance with an embodiment of the invention.

To further illustrate this point, and referring now to FIG. 6, a movable barrier operator remote control apparatus 60 can be configured to utilize the multiple oscillator circuit as generally described above. A controller 21 (realized here through use of a microprocessor) couples to a memory 23 (realized here through use of an electronically erasable programmable read only memory) as described earlier. The user interface 22 can be comprised of a sufficient number of push button switches to match the desired number of transmission messages and/or systems (in this illustrative example, a "move the movable barrier" command is supported for each of three different makes of movable barrier operator). In addition, dual in-line package switches 61 can be utilized to aid in configuring the apparatus 60 in a manner already well understood in the art. Also, if desired, additional switches or other user interfaces (not shown) can be provided to permit the controller 21 to be placed into various selectable operating states (such as a learning mode of operation, a vacation mode of operation, and so forth) as is also already well understood in the art.

The controller 21 operably couples to each of three oscillator circuits 51, 52, and 62 wherein each oscillator circuit has a corresponding mechanically resonant device 24, 25, and 63. In this embodiment, each of the oscillator circuits is identical to the other two oscillator circuits with the exception of the resonant frequency of each respective mechanically resonant device. For example, in this illustrative embodiment, the first oscillator circuit 51 has a mechanically resonant device 24 comprising a surface acoustic wave device having a resonant frequency of 390 MHz. The second oscillator circuit 52, however, has a mechanically resonant device 25 comprising a surface acoustic wave device having a resonant frequency of 310 MHz. And the third oscillator circuit 62 has a mechanically resonant device 63 comprising a surface acoustic wave device having a resonant frequency of 300 MHz. In other respects these oscillators are of substantially conventional design and have specific component values as follows:

Resistor R1—18 K Ohms;
Resistor R2—100 K Ohms;
Resistor R3—100 Ohms;
Capacitor C1—100 pFarads;
Capacitor C2—In a preferred embodiment, this capacitor comprises a negative positive zero capacitor such that its capacitance does not change appreciably over a useful temperature range. Note that this capacitance can be designed into the resonant device itself if desired.
Capacitor C3—2.0 pFarads;
Capacitor C4—470 pFarads;
Capacitor C5—5.0 pFarads;
Capacitor C6—12 pFarads;
Inductor L1—22 nHenrys;
Transistor T1—NE94433.

So configured, the controller 21 can selectively actuate any of these three oscillator circuits 51, 52, and 62 to provide a resultant corresponding oscillation signal to a transmitter 26.

As noted earlier, the transmitter can be of any desired design. For purposes of this illustration, and to enable a wireless transmit-only remote control apparatus, the transmitter 26 can be of a standard design as depicted, and wherein the denoted components have the following values:

Resistor R4—10 K Ohms;
Resistor R5—100 Ohms;
Resistor R6—1 K Ohms;
Capacitor C7—1.0 pFarad;
Capacitor C8—3 pFarad;
Capacitor C9—1.0 pFarad;
Inductor L2—33 nHenrys;
Inductor L3—2.2 nHenrys;
Transistor T2—NE94433.

So configured a relatively inexpensive wireless transmit-only apparatus can be realized. In addition, the form factor for this apparatus can be maintained within a sufficiently compact boundary to permit effective and acceptable usage of this apparatus as, for example, a wireless remote control transmitter suitable for use with a plurality of differing movable barrier operator systems. As depicted, the apparatus can work compatibly with a first moveable barrier operator system that utilizes a 390 MHz transmission carrier frequency, a second movable barrier operator system that utilizes a 310 MHz transmission carrier frequency, and a third movable barrier operator system that utilizes a 300 MHz transmission carrier frequency. Notwithstanding this flexibility with respect to frequency agility, the overall cost of implementation remains within commercially acceptable bounds.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A wireless transmit-only apparatus comprising:

a user interface comprising at least one independently assertable input;

a plurality of mechanically resonant devices that differ from one another with respect to a characteristic resonant frequency;

a memory containing a plurality of characterizing transmission parameters comprising characterizing transmission parameters that correspond to particular ones of the plurality of mechanically resonant devices, wherein the characterizing transmission parameters correspond to a plurality of transmission messages, which plurality of transmission messages each have:

substantially common bearer content as compared to others of the plurality of transmission messages; and at least one substantially differing characterizing transmission parameter as compared to others of the plurality of transmission messages;

a controller having access to correlation data that correlates the at least one independently assertable inputs with a corresponding one of the plurality of transmission messages and hence to a particular one of the plurality of mechanically resonant devices, such that assertion of the independently assertable input will result in selection of a particular corresponding one of the plurality of mechanically resonant devices for use when transmitting a particular one of the plurality of transmission messages.

2. The wireless transmit-only apparatus of claim 1 wherein the user interface comprises at least three independently assertable inputs.

3. The wireless transmit-only apparatus of claim 2 wherein the at least three independently assertable inputs each comprise a discrete push button.

4. The wireless transmit-only apparatus of claim 1 wherein the plurality of mechanically resonant devices comprise at least one of:

a surface acoustic wave device;

a crystal resonator; and a ceramic resonator.

5. The wireless transmit-only apparatus of claim 1 wherein the plurality of mechanically resonant devices each comprises a surface acoustic wave device.

6. The wireless transmit-only apparatus of claim 1 wherein the plurality of mechanically resonant devices comprise at least two of:

a surface acoustic wave device;

a crystal resonator; and a ceramic resonator.

7. The wireless transmit-only apparatus of claim 1 wherein the plurality of mechanically resonant devices comprises:

an oscillator circuit;

a plurality of switches arranged and configured to selectively switch each of the plurality of mechanically resonant devices in and out of the oscillator circuit to thereby facilitate control over a resonant frequency of the oscillator circuit.

8. The wireless transmit-only apparatus of claim 1 wherein the plurality of mechanically resonant devices comprises a plurality of oscillator circuits wherein each of the oscillator circuits has a different one of the plurality of mechanically resonant devices such that each of the plurality of oscillator circuits has a different resonant frequency.

9. The wireless transmit-only apparatus of claim 1 wherein the characterizing transmission parameters further comprise at least one of:

data frame structure information;

a particular operational code;

a rolling code value;

an algorithm to facilitate calculation of a next code to transmit.

10. The wireless transmit-only apparatus of claim 1 wherein the substantially common bearer content comprises instructional content.

11. The wireless transmit-only apparatus of claim 10 wherein the instructional content comprises an instruction to cause a movable barrier to move from a present position to a different position.

12. The wireless transmit-only apparatus of claim 1 wherein the at least one substantially differing characterizing transmission parameter comprises at least one of:

data frame structure information;

a particular operational code;

a rolling code value;

an algorithm to facilitate calculation of a next code to transmit.

13. The wireless transmit-only apparatus of claim 1 wherein the controller comprises controller means for responding to assertion of a given one of the at least one independently assertable input by selecting corresponding characterizing transmission parameters to thereby cause a transmitter to utilize a particular mechanically resonant device as corresponds to the selected corresponding characterizing transmission parameters when transmitting the transmission message that corresponds to the selected corresponding characterizing transmission parameters.

14. A wireless transmit-only remote control apparatus comprising:

a user interface comprising at least one independently assertable button;

a plurality of mechanically resonant devices that differ from one another with respect to a characteristic resonant frequency;

a memory containing a plurality of characterizing transmission parameters comprising characterizing transmission parameters that correspond to particular ones of the plurality of mechanically resonant devices, wherein the characterizing transmission parameters correspond to a plurality of remote control transmission messages, which plurality of remote control transmission messages each have:

substantially common remote control instructional content as compared to others of the plurality of transmission messages; and at least one substantially differing characterizing transmission parameter as compared to others of the plurality of transmission messages;

a controller having access to correlation data that correlates at least one of the at least one independently assertable button with a corresponding one of the plurality of remote control transmission messages and hence to a particular one of the plurality of mechanically resonant devices, such that assertion of a given one of the at least one independently assertable button will result in selection of a particular corresponding one of the plurality of mechanically resonant devices for use when transmitting a particular one of the plurality of remote control transmission messages.

15. The wireless transmit-only remote control apparatus of claim 14 wherein the mechanically resonant devices each comprise a surface acoustic wave device.

16. The wireless transmit-only remote control apparatus of claim 15 and further comprising a transmitter that is operably coupled to the controller and that includes an oscillator circuit that switchably includes each of the surface acoustic wave devices.

17. The wireless transmit-only remote control apparatus of claim 15 and further comprising a transmitter that is operably coupled to the controller and that comprises a plurality of switchably selectable oscillator circuits, wherein each of the oscillator circuits includes a different one of the surface acoustic wave devices.

18. A method of facilitating selection of a transmission frequency for a transmit-only apparatus comprising:

detecting assertion of a particular one of a plurality of discrete user assertable inputs;

identifying a particular mechanically resonant device of a plurality of discrete mechanically resonant devices as corresponds to the particular one of the plurality of discrete user assertable inputs;

transmitting a message comprising bearer content that corresponds to the particular one of the plurality of discrete user assertable inputs using the particular mechanically resonant device, wherein the message comprises bearer content that is substantially common as compared to a message that is transmitted upon assertion of at least one other of the plurality of discrete user assertable inputs.

19. The method of claim 18 wherein detecting assertion of a particular one of a plurality of discrete user assertable inputs comprises detecting assertion of a particular one of a plurality of three discrete user assertable inputs.

20. The method of claim 18 wherein detecting assertion of a particular one of a plurality of discrete user assertable inputs comprises detecting assertion of a particular one of a plurality of push buttons.

21. The method of claim 18 wherein identifying a particular mechanically resonant device of a plurality of discrete mechanically resonant devices comprises identifying a particular mechanically resonant device of three discrete mechanically resonant devices.

22. The method of claim 18 wherein identifying a particular mechanically resonant device of a plurality of discrete mechanically resonant devices comprises identifying a particular surface acoustic wave device of a plurality of discrete surface acoustic wave devices.

23. The method of claim 18 wherein identifying a particular mechanically resonant device of a plurality of discrete mechanically resonant devices comprises identifying a particular crystal resonator of a plurality of discrete crystal resonators.

24. The method of claim 18 wherein identifying a particular mechanically resonant device of a plurality of discrete mechanically resonant devices comprises identifying a particular ceramic resonator of a plurality of discrete ceramic resonators.

25. The method of claim 18 wherein identifying a particular mechanically resonant device of a plurality of discrete mechanically resonant devices comprises identifying a particular mechanically resonant device of a plurality of mechanically resonant devices that include at least one of:

a surface acoustic wave device;

a crystal resonator; and a ceramic resonator.

* * * * *

UNITED STATES PATENT AND TRADEMARK OFFICE

CERTIFICATE OF CORRECTION

PATENT NO. : 7,174,137 B2
APPLICATION NO. : 10/645325
DATED : February 6, 2007
INVENTOR(S) : James J. Fitzgibbon et al.

It is certified that error appears in the above-identified patent and that said Letters Patent is hereby corrected as shown below:

TITLE PAGE

Column 2, Item [56] Foreign Patent Documents: Change "JP 40406494 A" to -- JP 404046494 A --

Signed and Sealed this

Seventeenth Day of April, 2007

JON W. DUDAS

*Director of the United States Patent and Trademark Office*